Jan. 17, 1961   W. HAMILTON ET AL   2,968,410
TOWERS

Filed Nov. 28, 1956   7 Sheets-Sheet 1

INVENTORS
WALLACE HAMILTON
JACK LOVELL
BY
ATTORNEY

Jan. 17, 1961 W. HAMILTON ET AL 2,968,410
TOWERS
Filed Nov. 28, 1956 7 Sheets-Sheet 2

INVENTORS
WALLACE HAMILTON
JACK LOVELL
BY
ATTORNEY

INVENTORS
WALLACE HAMILTON
JACK LOVELL
ATTORNEY

Jan. 17, 1961 W. HAMILTON ET AL 2,968,410
TOWERS
Filed Nov. 28, 1956 7 Sheets-Sheet 5

INVENTOR.
WALLACE HAMILTON
JACK LOVELL
BY
ATTORNEY

Jan. 17, 1961 W. HAMILTON ET AL 2,968,410
TOWERS
Filed Nov. 28, 1956 7 Sheets-Sheet 6

FIG. 13

INVENTORS
WALLACE HAMILTON
JACK LOVELL
BY
ATTORNEY

Jan. 17, 1961 W. HAMILTON ET AL 2,968,410
TOWERS
Filed Nov. 28, 1956 7 Sheets-Sheet 7

INVENTORS
WALLACE HAMILTON
JACK LOVELL
BY
ATTORNEY

United States Patent Office 2,968,410
Patented Jan. 17, 1961

2,968,410
TOWERS

Wallace Hamilton, Bentleyville, and Jack Lovell, Chagrin Falls, Ohio, assignors to Cleveland Pneumatic Industries, Inc., a corporation of Ohio Filed Nov. 28, 1956, Ser. No. 624,938

4 Claims. (Cl. 214—1)

This invention relates generally to tower structures and more particularly to an erector tower suitable for use in the erection of missiles and the like.

Generally speaking, missiles are fired from the vertical position, so means must be provided to raise them from the horizontal position, in which they are stored and transported, to the vertical firing position. An erector according to this invention enables the easy erection of the missile from the horizontal position to the vertical or firing position in a manner which is essentially automatic once the missile is placed within the erector or tower.

It is an important object of this invention to provide an erection tower capable of elevating large loads from a horizontal to a vertical position with the minimum amount of manual operation and in the minimum amount of time.

It is another important object of this invention to provide an erector tower having novel means for controlling and supporting the load during the erection thereof.

It is still another object of this invention to provide an erection tower suitable for raising missiles from the horizontal to the vertical position prior to the firing thereof.

It is still another object of this invention to provide an erection tower into which a missile and its ground transportation vehicle can be received in combination with means for removing the missile from its ground transportation vehicle so that such vehicle can be removed from the tower prior to the erection of the missile.

It is still another object of this invention to provide an erection tower for missiles or the like wherein the various elements are arranged so that the minimum weight is lifted when the structure is raised to elevate the missile.

Further objects and advantages will appear from the following description and drawings, wherein:

Figure 9b is a side elevation in longitudinal section showing the position the elements of the hydraulic actuators assume when the tower is in the horizontal position of Figure 9a;

Figure 10b is a side elevation in longitudinal section of one of the hydraulic actuators showing the position of the actuator elements when the tower is in the position of 10a;

Figure 11b is a view similar to Figures 9b and 10b showing one of the hydraulic actuators in the fully extended position which occurs when the tower is in the erected position of Figure 11a;

It should be understood that this invention is directed toward a missile handling tower and that the missile forms no part of this invention. However, for the purposes of illustration, the missile is shown in phantom in many of the figures and will be discussed in its co-operation with the tower. Various structural elements of the tower and non-essential components have been eliminated in some of the views in order to simplify the understanding of the mechanism and structures utilized.

Referring to the drawings, the tower 10 is formed of the two pairs of longitudinal beams 9 and 11 connected by back and side cross beams 12 and 15 respectively at suitable intervals along the length of the beams to form an elongated structure having a U-shaped section open on its upper side when the tower is in the horizontal position. Diagonal braces 13 can be used to provide additional stiffening and to increase the strength where necessary. Normally, the various elements will be welded together to their junctions, however, riveting or bolting can be used if such a construction is better suited for a particular application. The tower 10 is pivoted at 14 on the ground so that it can be rotated from the horizontal position to the vertical position.

Figures 1, 2:
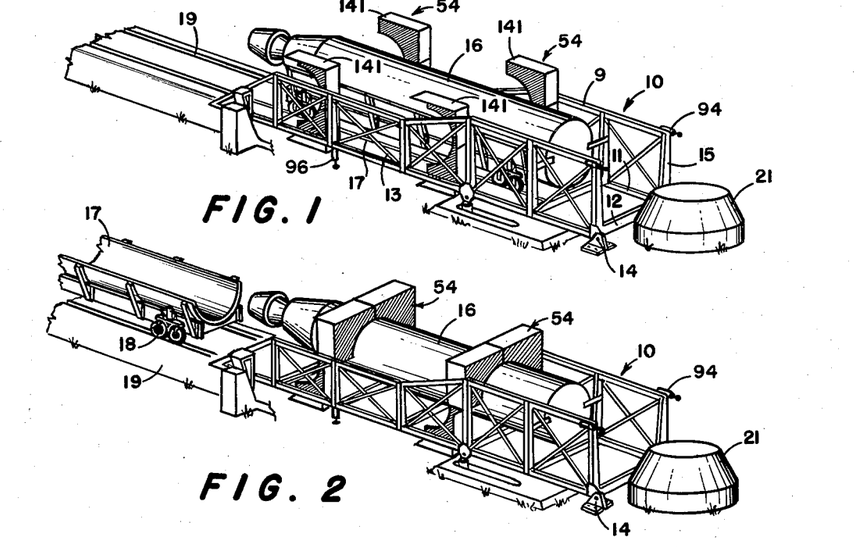
Figure 1 is a schematic view showing a preferred form of the erection tower during the first step of the erection cycle wherein the missile and its ground transporting vehicle are positioned within the tower.
Figure 2 is a schematic view of the second step of the cycle when the missile is supported in the tower after the ground transporting vehicle has been removed.
Figure 3:
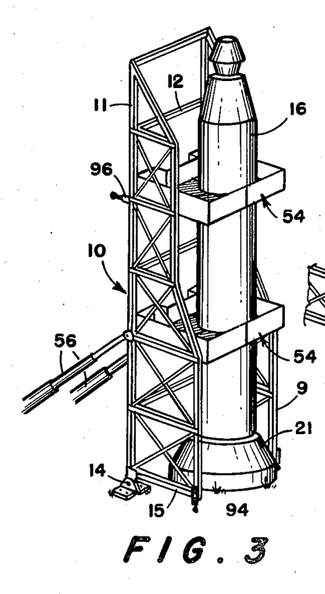
Figure 3 is a schematic view of the third step when the tower and missile have both been raised to the vertical position.

In Figure 1, the tower is shown in the horizontal position with a missile 16 and a missile transporting vehicle 17 positioned therein. The missile transporting vehicle 17 would normally be provided with wheels 18 that roll along a roadway 19 which extends along the ground into the tower 10. After the missile 16 is positioned within the tower 10, the missile is transferred from the vehicle 17 to the supporting structure in the tower, and the vehicle 17 is removed as shown in Figure 2. The tower can then be raised to the vertical position shown in Figure 3 thereby lifting the missile 16 to its vertical or firing position.

Figure 4:
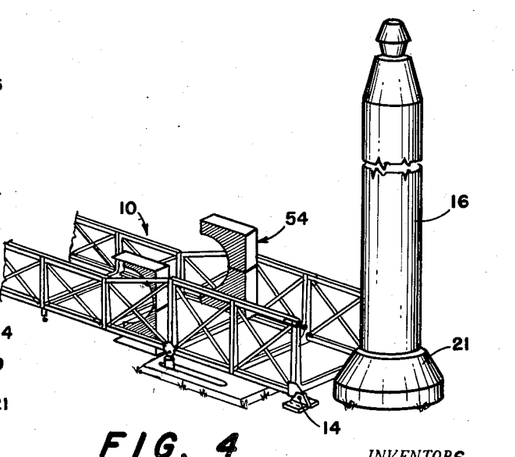
Figure 4 is a schematic view of the fourth and final step when the missile is in the vertical position and the tower has been returned to the horizontal position.

Once the missile is in the vertical position, it is lowered onto a firing base 21 from which it is fired. After the arming and fueling of the missile, the various elements of the tower 10 are retracted to clear the missile and the tower is returned to the horizontal position, as shown in Figure 4. At this time, the missile 16 is supported on the base 21 and ready for firing.

Figure 5:
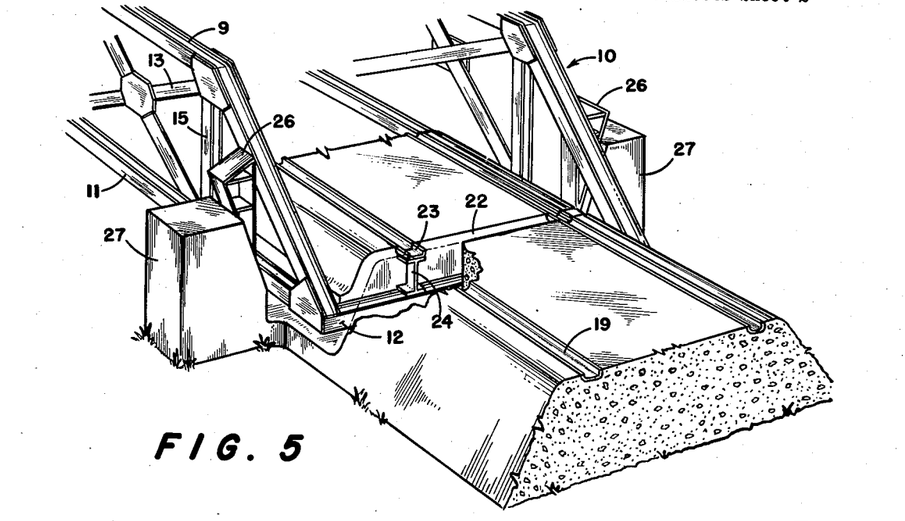
Figure 5 is a fragmentary perspective view showing the tower structure which enables the use of a ground roadway for the ground transporting vehicle and the alignment structure utilized to laterally position the tower as it approaches the horizontal position.

In order to provide a roadway which extends into the tower 10 without necessitating the use of roadway rails supported by the tower throughout the entire length of the tower, we prefer to utilize a structure wherein the roadway between the back or bottom cross beams 12 is supported by the ground as shown in Figure 5. Because the back cross beams 12 must be below the level of the roadway 19 when the tower is in the horizontal position, the roadway 19 is provided with gaps 22 adapted to receive the back cross beams 12. To bridge the gaps 22 we must provide short roadway segments 23 which are carried by cross beams 12 through support members 24 having an I-shaped cross section. The support members 24 are welded to the roadway segments 23 and to the cross beams 12 and proportioned so that the roadway segments 23 are in alignment with the roadway 19 when the tower is in the horizontal position. By utilizing this structure, it is possible to reduce the weight of the tower and thereby reduce the weight that must be raised to the vertical position. Mounted at the upper end of the tower 10 are opposed wedge members 26 which engage wedge blocks 27 mounted on the ground to laterally position the tower 10 as it approaches the horizontal position. Those skilled in the art will recognize that such a structure will provide accurate lateral positioning of the upper end of the tower since the wedge structure operates as a cam to move the elements laterally into the proper position as the tower approaches the horizontal position.

Figure 6:
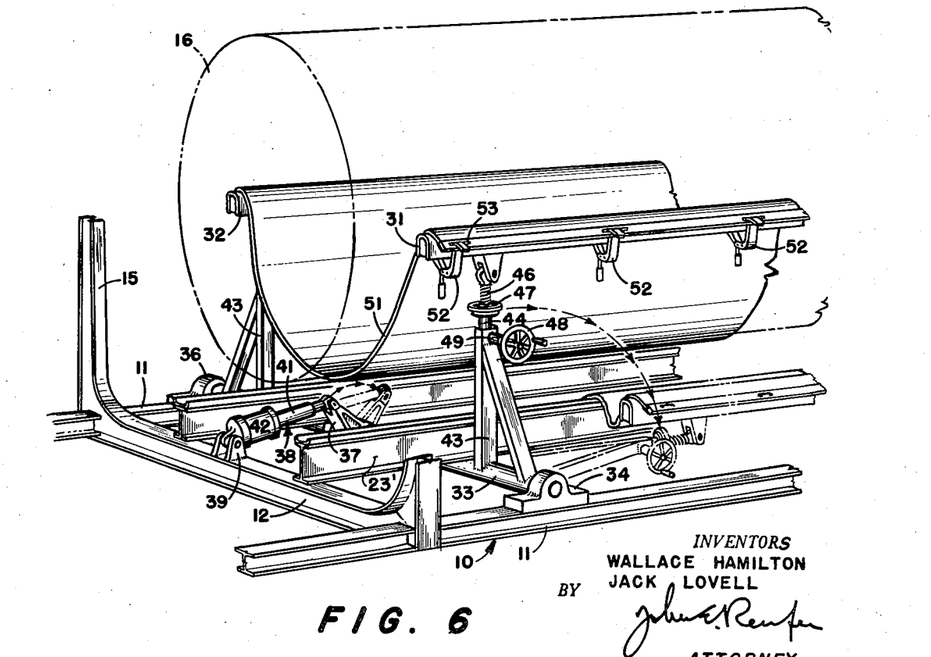
Figure 6 is a fragmentary perspective view of the means utilized to support the missile when the transportation vehicle is removed which means provide adjustment for the accurate positioning of the missile within the tower.

To provide for the transfer of the missile 16 from the vehicle 17 to the tower 10, we prefer to utilize a structure of the type disclosed in Figure 6. A pair of parallel support rails 31 and 32 are mounted on the pair of longitudinal beams 11 by an adjusting mechanism about to be described. The adjusting mechanism includes a shaft 33 pivotally mounted at its ends in bearing blocks 34 and 36 which are in turn welded to the longitudinal beams 11. Welded to the shaft 33 is a laterally extending arm 37 which is connected to one end of an actuator 38, the other end of which is pivotally mounted on lugs 39 welded to a cross beam 12. The actuator 38 is preferably of the type including a motor driven screw which produces axial motion of an output member 41 relative to a motor body 42. It may be desirable, however, to use a hydraulic piston and cylinder actuator if such a device would more closely meet the needs of a particular installation. In any case, the actuator 38 is arranged to provide rotation of the arm 37 and the shaft 33 between the solid position and the phantom position of Figure 6. The shaft 33 is provided with a U-shaped stanchion 43 adjacent to each end thereof which are rotated with the shaft 33 by the actuator 38 between the upright position shown and the retracted or down position shown in phantom. A hollow adjustment shaft 44 is pivotally mounted at 44a within the U of each of the stanchions 43. A screw threaded member 46 projects into and is laterally supported by the shaft 44. A hand wheel nut 47 engages the thread on the screw member 46 and the top of the hollow shaft 44 so rotation of the hand wheel 47 causes the screw threaded member 46 to be either raised or lowered relative to the hollow shaft 44 and in turn the associated stanchion 43. The threaded members 46 are pivotally connected to the associated support rails 31 and 32 so that either of the rails 31 and 32 can be raised or lowered by rotating the proper hand wheel nut 47. To provide lateral adjustment of the support rails 31 and 32, we provide a horizontal adjustment hand wheel 48, which is mounted on a threaded shaft 49 which co-operates with threads formed in the stanchions 43 to produce lateral motion of the shaft 49 relative to the stanchions when the hand wheel 48 is rotated. The end of the shaft 49 is provided with socket means 49a (shown in Figure 6a) to connect it to the shaft 44 so lateral movement of the threaded shaft 49 creates lateral movement of the hollow shaft 44 and in turn lateral adjustment of the associated support rail 31 or 32. It should be understood that there is a similar adjustment mechanism at each end of the support rails 31 and 32 which can be individually adjusted to raise, lower, or laterally move the associated end of the support rails. Each mechanism includes a pair of stanchions 43 welded to a shaft 33 which can be rotated by the actuator 38 to cause axial movement of the support rails. Therefore, the support rails can be moved in any direction relative to the tower 10 within the range of the adjustment.

Figure 7:
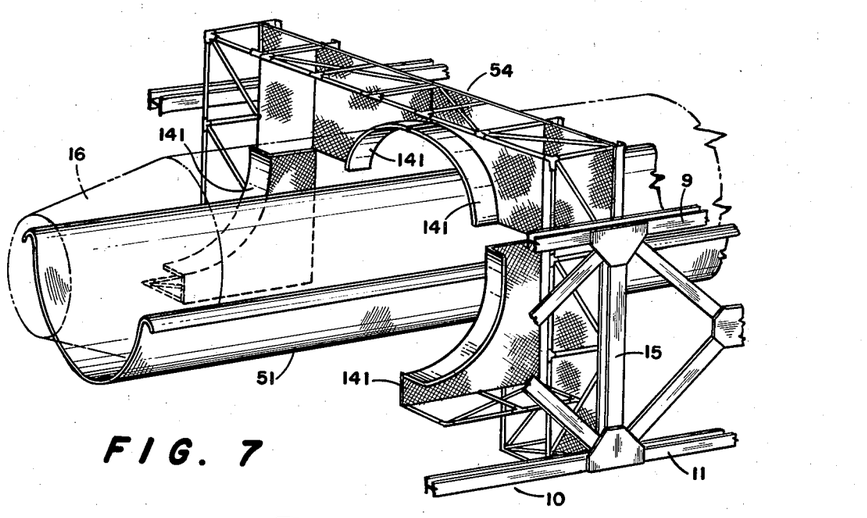
Figure 7 is a fragmentary perspective view of one of the work platforms which is also used to position and hold the missile prior to erection thereof.

In the preferred embodiment, the missile 16 is located on a sling 51 when it is placed on the vehicle 17. When the vehicle 17 is moved along the roadway 19 into the tower, the support rails 31 and 32 are raised to the position of Figure 6. At this time, the edges of the sling 51, which is preferably formed of a strong flexible fabric, are wrapped over the support rails 31 and 32 and secured thereto by a plurality of toggle clamps 52 which are mounted on the support rails 31 and 32 at intervals along their length. The sling 51 is preferably formed with reinforced grommets 53 through which the toggle clamps 52 project. After the clamps 52 are connected to the sling 51 the vehicle 17 can be lowered by compressing its suspension syste m or the support rails 31 and 32 can be raised by the hand wheels 47 so that the weight of the missile 16 is transferred from the vehicle 17 to the support rails 31 and 32. When the missile 16 is supported in the sling 51, the vehicle 17 can be removed from the tower 10. Two of the upper work platforms 54 are then moved from their retracted position to their extended position so that they embrace the upper side of the missile, as shown in Figures 2 and 7. The support rails 31 and 32 are then adjusted until the missile is positioned against the extended portions of the work platforms 54 which serve as a positioning guide or gage means. It should be noted that the roadway segments 23′, adjacent to the support rail adjustment mechanism shown in Figure 6, extends longitudinally of the tower between the cross beams 12 on either side of the shaft 33. It is desirable to use this longer segment adjacent to the adjustment mechanism since the shaft 33 must extend below the level of the roadway 19, and the use of the short roadway segments 23, as shown in Figure 5 would become cumbersome at this location. To provide clearance for the shaft 33 and the roadway segment 23′ it is necessary to provide a relief in the ground and a longer gap in the ground roadway 19. This structure is only to be used at the locations of the shaft 33 so the additional tower weight due to the longer roadway segment 23′ will not be excessive.

Figures 6A, 8:
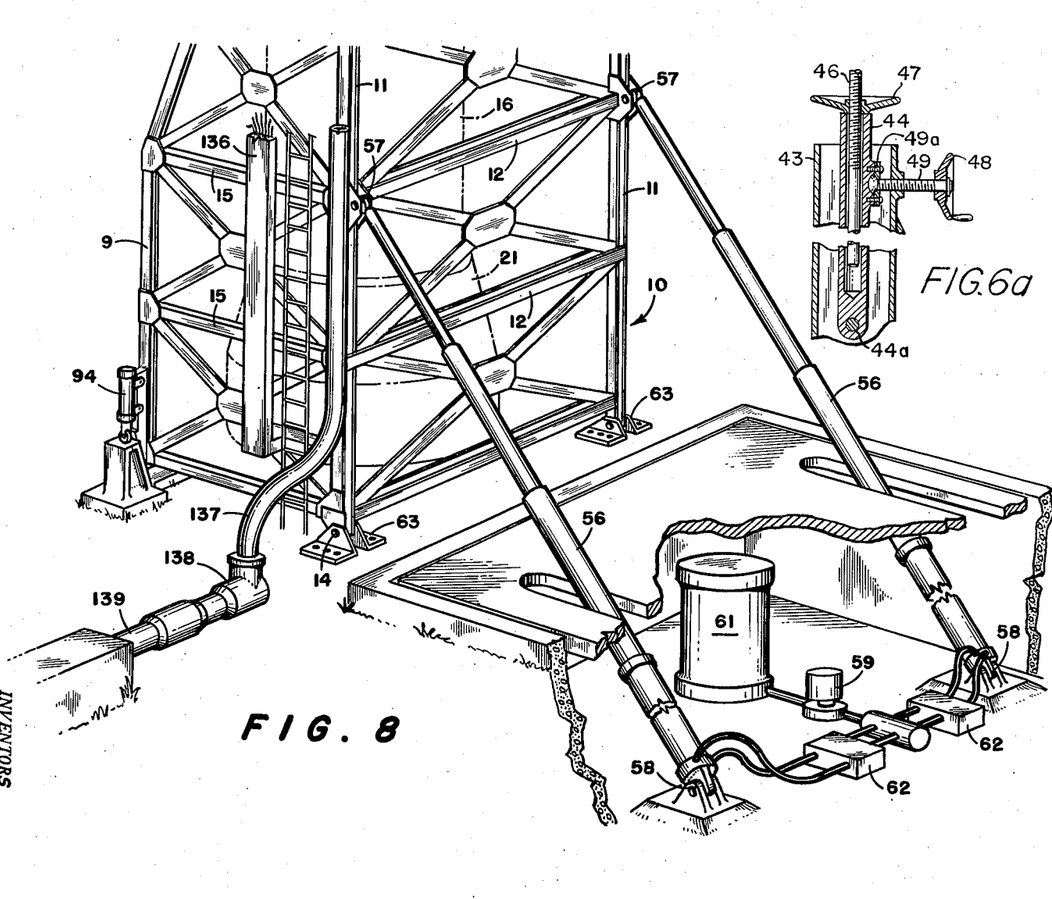
Figure 6a is an enlarged fragmentary section illustrating the structure of the means providing adjustment for the positioning of the missile within the tower.
Figure 8 is a fragmentary perspective view of the lower portion of the tower and the actuator system utilized to raise and lower the tower.

Once the missile is properly positioned within the tower 10 and the vehicle 17 is removed from the tower by a tractor or the like, the tower can be elevated to the vertical position, carrying with it the missile 16 which is supported on its underside by the sling 51 while its upper side is engaged by the work platforms 54. To provide for the raising or elevating of the tower, we prefer to utilize a pair of hydraulic actuators 56. One end of each hydraulic actuator 56 is pivotally connected to a bearing 57 mounted on one of the longitudinal beams 11 and the other end of each actuator 56 is pivotally connected to a bearing 58 supported by the ground. In the preferred installation, the bearing 58 is mounted below the surface of the ground so that the tower 10 will be in the horizontal position when the actuators 56 are in their compressed positions. A suitable hydraulic pump 59, reservoir 61 and control valve 62 can be provided to supply and control the flow of the fluid under pressure for the operation of the actuators 56. When the tower is to be raised, the actuators 56 are supplied with pressure fluid which causes the actuators to extend and rotate the tower 10 and missile 16 about the pivot 14 to the vertical position.

Reference should now be made to Figures 9a through 11b for the structural details and operation of the actuators 56. Both of the actuators 56 are identical, so only one will be described with the understanding that such description will apply equally to the other actuator. In the illustrated embodiment, the actuators 56 have three stages of pistons so that the actuator will be relatively short in the compressed position, even though it is long in its extended position. A hollow cylinder 71 is pivotally connected to the bearing 63 by a mounting lug 72 and is provided with a cylinder bore 73 adapted to receive an outer piston 74. A gland member 76 is threaded into the upper end of the cylinder 71 and provides lateral support for the outer piston 74. The inner end of the outer piston 74 is provided with a seal flange 77 which provides lateral support for the inner end of the piston 74 and sealing engagement with the bore 73. The outer cylinder 74 is provided with a bore 78 which receives an intermediate piston 79 which in turn is formed with a seal flange 81, similar to the sealing flange 77. Again, a gland 82 is threaded into the outer piston 74 to provide lateral support between it and the intermediate piston 79. The intermediate piston 79 is formed with a bore 83 into which an inner piston 84 projects. Here again, the inner piston 84 is provided with a seal flange 86 which engages the bore 83. In this case a gland 87 is threaded into the upper end of the intermediate piston 79 to provide lateral support between it and the inner piston 84, and in addition, sealing engagement with the outer wall of the inner piston 84. Therefore a separate chamber 91 is provided between the pistons 79 and 84. The upper end of the inner piston 84 is closed by an end portion 90 which is mounted on the bearing 57 of the tower 10. When fluid under pressure is admitted into the lower end of the cylinder 71 through a pressure line 88, a force is produced on each piston urging it upwardly relative to the cylinder 71. The fluid force on each piston is a function of the pressure in the cylinder 71 times the effective area of each piston. Since the outer piston 74 has the largest effective area, the force urging it upwardly relative to the cylinder 71 will be largest for any given fluid pressure. Therefore, initially as the actuator 56 is pressurized, the outer piston 74 will move up relative to the cylinder 71 and start the erection of the tower 10. Each of the pistons 74 and 79 are provided with stop flanges 89 which prevent each piston from moving upwardly relative to the next smaller piston beyond the position of Figure 9b. Therefore, as the outer piston 74 moves upwardly relative to the cylinder 71, the intermediate piston 79 and the inner piston 84 are also carried upwardly. When the outer piston 74 reaches the end of its stroke, the flange 77 engages the gland 76 and the intermediate piston 79 moves relative to the outer piston 74, as shown in Figure 10b. Since the effective reaction force, on the intermediate piston 79, due to the pressure fluid in the cylinder 71, is greater than the reaction force on the inner piston 84, the inner piston 84 remains stationary relative to the intermediate piston 79. When the intermediate piston 79 reaches the end of its stroke, the inner piston 84 starts to move relative thereto until all of the pistons reach their extended position and the tower is in the erected or upright position.

Figure 9A:
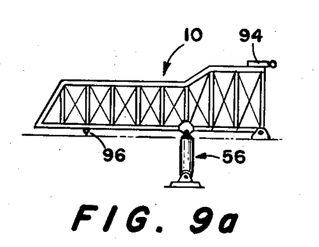
Figure 9a is a schematic view of the tower and hydraulic actuators in the horizontal position.
Figures 9B, 10B:
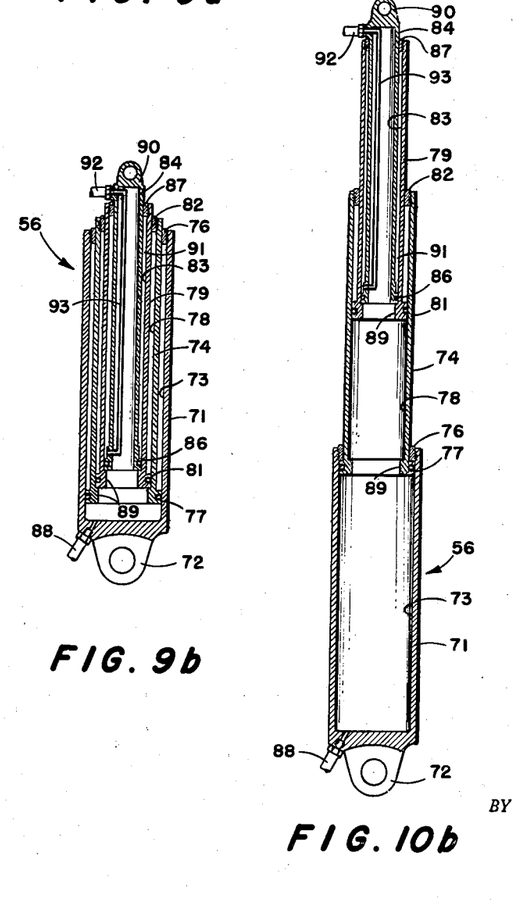
Figure 10A:
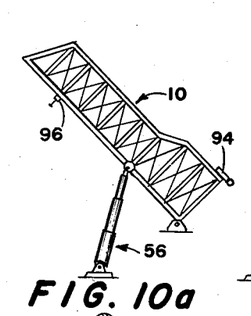
Figures 10a is a view similar to 9a showing the position of the tower in an intermediate elevated position.
Figure 11A:
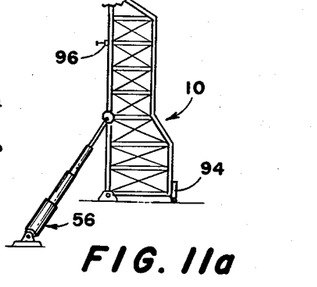
Figure 11a is a schematic view similar to Figures 9a and 10a showing the tower in the fully erected position.
Figure 11B:
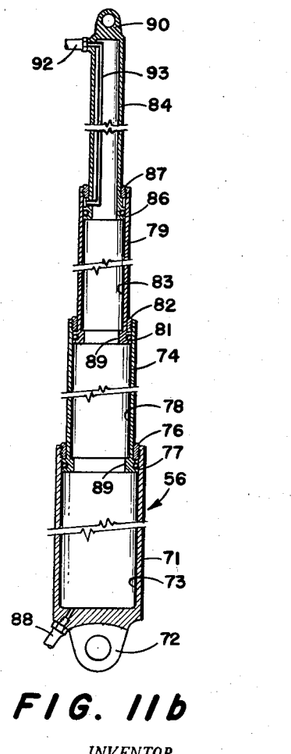

It should be noted that the greatest erection force is required when the tower is in the horizontal position and that the required erection force reduces as the tower approaches the upright position. Since the force produced by the actuators 56 for any given fluid pressure is initially large and decreases as the various pistons progressively operate due to their decreasing effective area, the available force is large when a large force is needed and decreases as the force requirement drops off. The proportions are arranged so that the inner piston 84 is extending when the center of gravity of the tower and load passes over the pivot 14. Therefore, we connect the chamber 91 to the hydraulic reservoir through a flow restriction which provides damping and controls the rate of extension between the inner piston 84 and the intermediate piston 79. This in turn controls the rate of movement of the tower between the position where the center of gravity passes over the pivot 14 and the vertical or erected position to prevent rapid movement which could cause damage to the structure or load.

In order to cause initial movement of the tower 10 from the vertical position toward the horizontal position, we utilize the chamber 91 defined between the inner piston 84 of the intermediate piston 79. When it is desired to lower the tower 10, the pressure line 88 is connected to the reservoir 61 and pressure fluid is admitted to the chamber 91 through a pressure line 92. This produces a force urging the inner piston 84 downwardly relative to the intermediate piston 79 and initiates lowering of the tower 10. To connect the pressure line 92 with the chamber 91, we utilize a pressure pipe 93 which extends axially along the bore of the inner piston 84. The various elements are proportioned so that the center of gravity of the tower 10 will pass over the pivot 14 of the tower before the inner piston 84 has moved to its fully compressed position. Therefore, this mechanism has sufficient stroke since the weight of the tower will cause it to be lowered without necessitating the use of power once the center of gravity has moved over the pivot 14. To control the lowering of the tower 10, we provide an orifice (not shown) in the connection between the pressure line 88 and the reservoir 61 which controls the speed of compression of the actuator 56 and in turn the rate the tower 10 is lowered. It is important that the initial lowering is accomplished by compression of the inner piston 84 because the inner piston 84 would be the first to move toward the compressed position as the tower is lowered against the actuator fluid pressure which is created by the weight of the tower.

To assist in the smooth operation of the tower as it is raised, we provide shock absorbing springs 94 which engage the ground as the tower 10 approaches the upright position. These springs are preferably provided with hydraulic dampers which control the rate of movement of the tower 10 as it approaches the upright position and thereby prevents jarring or erratic action caused by winds or the like. Similarly, shock absorbing springs 96 are mounted on the tower 10 to engage the ground as the tower 10 approaches the horizontal position. Here again, we prefer to use springs having hydraulic damping which controls the rate of movement of the tower as it approaches the horizontal position to prevent jarring of the mechanism. Also, the springs 96 should be sized so that the weight of the empty tower 10 will just compress the springs when it is in the horizontal position. Therefore, the springs 96 do not prevent complete lowering of the tower but provides a boost to assist the actuators 56 in the initial raising of the tower 10 when the loads on the actuator 56 and the stresses on the tower 10 are largest.

Figure 12:
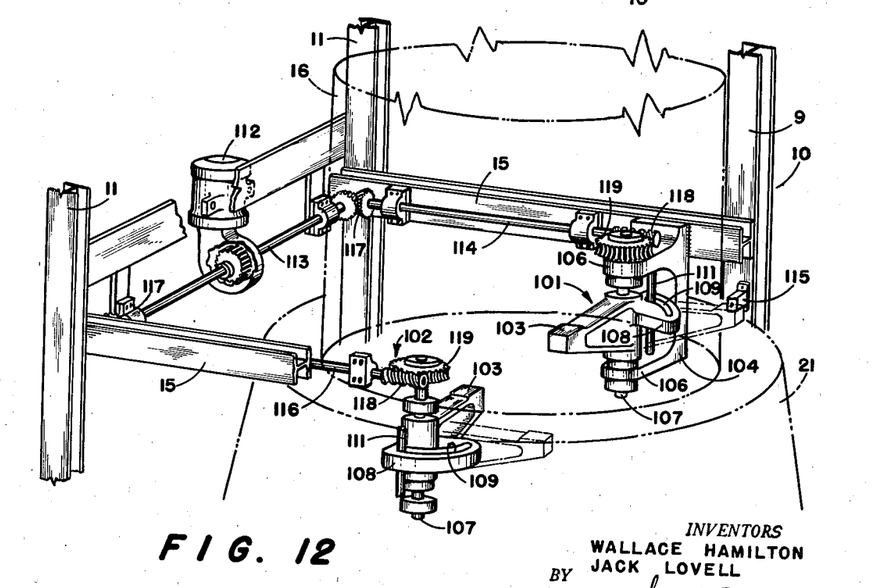
Figure 12 is a fragmentary perspective view of the mechanism utilized to lower the missile to its firing base after it is in the vertical or erected position.

The sling 51 and the work platforms 54 provide lateral support for the missile 16 but as the missile is raised to the upright or erected position, it is necessary to provide means to engage the lower end of the missile to assume the missile weight and prevent axial movement of the missile relative to the tower. This mechanism, best shown in Figure 12, is mounted on the cross beams 15 and is adapted to engage the end of the missile prior to its erection and pick up the weight of the missile as it moves to the erected position. In the disclosed embodiment, there are two load assemblies 101 and 102 which are welded to the cross beams 15 and are provided with load arms 103 which are proportioned to engage the base or bottom of the missile and prevent it from sliding axially relative to the tower 10 as the tower is raised. The structure of the two load assemblies is similar so a description of the load assembly 101 will be given with the understanding that it applies equally to the load assembly 102. The load assembly 101 includes a base 104 welded to the cross beams 15 and formed with spaced laterally extending projections 106. A threaded shaft 107 is journaled on the projections 106 for rotation about an axis parallel to the major axis of the missile. The load arm 103 is provided with co-operating threads which engage the threaded shaft 107 so that relative rotation between the shaft 107 and load arm 103 produces relative axial motion therebetween. The load arm 103 is also provided with a second projection 108 formed with an accurate slot 109 through which projects a rod 111 that is fixed to the base 104. The rod 111 co-operates with the slot 109 to limit the rotation of the load arms 104 between the two extremes shown by the full view and phantom view in Figure 12. A geared motor 112 is mounted on a cross beam 12 and provided with an output shaft 113 which in turn is connected to two power shafts 114 and 116 by miter gears 117. A worm 118 is mounted on each of the shafts 114 and 116 which engages the worm wheel 119 mounted on each of the threaded shafts 107 so that the threaded shafts may be rotated by the motor 112. It is apparent, therefore, that the shafts 107 of the two load assemblies 101 and 102 can both be rotated at the same speed by the motor 112 to simultaneously move the load arms 103 axially of the threaded shaft 107.

Prior to the erection of the tower and missile, the motor 112 is operated to bring the load arms 103 into engagement with the bottom of the missile 16. Then as the tower 10 is raised the load of the missile is progressively assumed by the load arms 103 until the entire weight of the missile is carried by the load arms when the tower and missile are in the vertical or erected position. Once the tower is in the vertical position, the missile can be lowered to the base 21 by the motor 112 which rotates the shaft 107 to lower the load arms 103 until the end of the missile 16 engages and is supported on the base 21. Preferably, the threaded connection between the load arms 103 and the shafts 107 should be of an acme thread form proportioned so that the axial force applied to the load arms 103 will not produce rotation between the load arms and shafts 107. The motor 112 should be sized so that it is capable of overcoming the friction within the threaded connections and gearing so that the missile can be lowered, but it need not have sufficient power to overcome the friction of the mechanism and raise the missile, since the missile is not raised by this mechanism. As soon as the missile is supported by the base 21, the load is removed from the load arms 103 and the friction of the threaded connection will cause the load arms 103 to rotate with the shaft 107 to the phantom position of Figure 12, at which time they are clear of the missile 16. The rod 111 engages the end of the slots 109 when the load arms 103 are in the phantom position and limits the rotation beyond this point. Suitable limit switches 115 should be provided to be engaged by the load arms 103 and shut off the motor 112 when the load arms have reached the phantom or retracted position.

Figure 13:
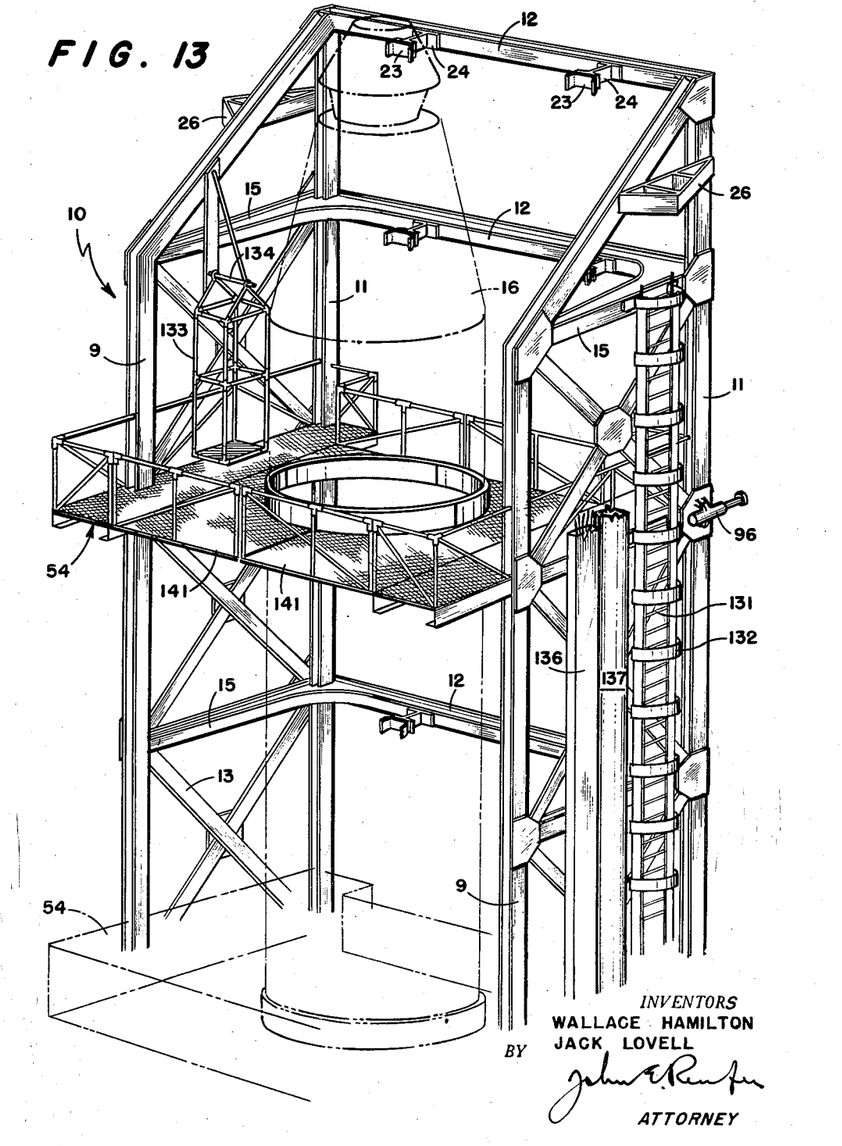
Figure 13 is a fragmentary perspective view showing a preferred structure of the upper work platform stage of the tower; and, Figures 14 and 15 are fragmentary perspective views showing the work platform mechanism in the operated position and retracted position, respectively.

In Figure 13, a perspective view is shown of the upper stage of the tower 10 and missile 16 which illustrates a preferred form of the work platform 54 utilized to give the service personnel access to the missile after it is in the erected position. Normally, several work platforms are provided at various positions along the tower 10 to give access to the various stations of the missile, with the exact number and their location dependent upon the structure of the missile itself. Also shown are some of the other structures which assist the personnel in servicing of the missile, such as a ladder 131 enclosed within guard bars 132, which the service personnel can use to reach the various platforms. A personnel carrier 133 can be provided at any stage along the tower, and prefrably, is formed as a cage in which one or two men can be carried. The personnel carrier 133 is pivoted on a shaft 134 which is in turn mounted on the tower 10 so that the carrier always remains in the vertical position regardless of the position of the tower 10. Therefore, the carrier will be in the vertical position when the tower 10 is lowered to the horizontal position, and will remain in the vertical position as the tower is raised to the erected position. In this way, service personnel can be transported with the tower as the tower and missile are erected. Suitable power line 136 can be mounted along the sides of the tower to provide electrical power at the various stages and if necessary, piping 137 can also be mounted on the outside of the tower so that fuel, compressed air, or any of the other fluids necessary for the servicing of the missile can be delivered at any required location on the tower. In Figure 8, the swivel connection 138 is disclosed which permits the use of rigid piping 137 connected to the ground pipe 139. The axis of the swivel 138 should be in alignment with the axis of the pivot 14 so that the tower is free to be raised or lowered without putting any stresses on the piping 137.

Figure 14:
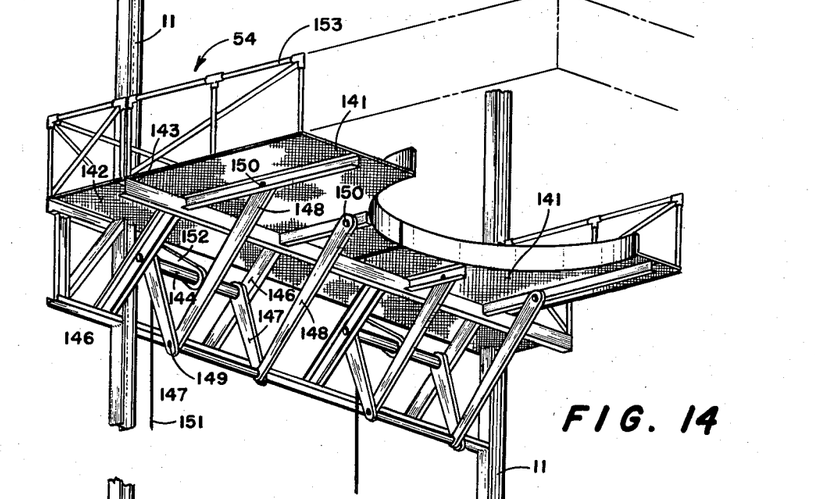
Figure 15:
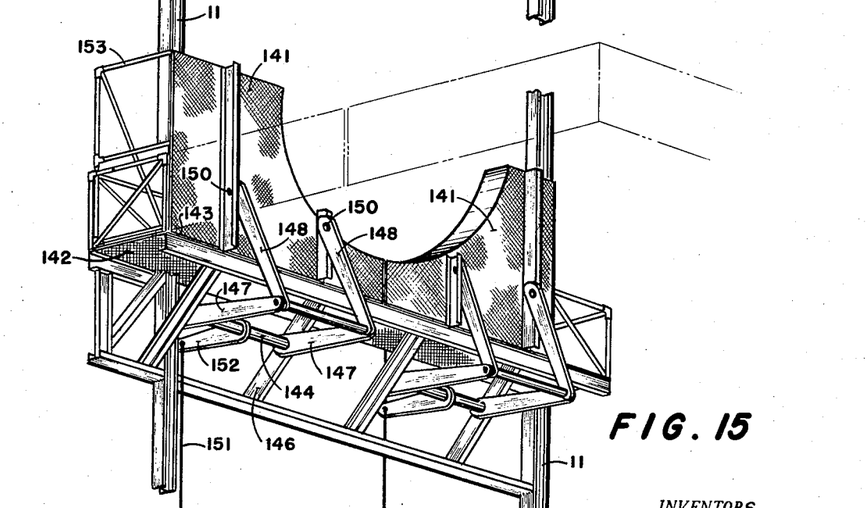

Referring to Figures 14 and 15, a preferred form of a platform 54 is shown. It should be understood that only one half of the platform is illustrated in the figures, and that the other half of the platform would be of a similar structure. The platforms 54 should be divided into four similar sections 141, two of which are shown in Figures 14 and 15. Each section can be raised or lowered independently and when all four sections are in the lowered position, the entire missile is surrounded by work platforms as shown in Figure 13. The platforms themselves are carried by the longitudinal beams and include a stationary portion 142 on either side of the tower 10. Two sections 141 are pivotally mounted at 143 on each of the stationary portions 142 for movement between the extended or down position of Figure 14 and the retracted or upright position of Figure 15. To operate the sections, we prefer to provide a shaft 144 for each section 141 journaled on diagonal beams 146. The shaft 144 is provided with lateral projections 147, the outer ends of which are pivotally connected to tie bars 148, at 149. The tie bars 148 are also pivotally connected to the associated sections 141 at 150 so rotation of the shaft 144 causes the associated section 141 to be raised or lowered, as the case may be. To rotate the shaft 144, we utilize a cable 151 which is connected to an arm 152 formed on each of the shafts 144. The cable can be pulled from the ground so that it is not necessary to provide power actuation means on the tower which would increase the weight of the tower. If it is desired, however, hydraulic or electric actuators could be utilized to rotate the shafts 144 to operate the sections 141.

By forming the work platforms 54 in four sections, as disclosed, it is possible to enclose any portion of the missile desired. For instance, in the initial positioning of the missile within the tower, only the upper sections of the work platforms would be operated to the extended position so that the missile would be restrained on the upper side by these sections 141, while the sling 51 surrounds the missile on the lower side. Since the remaining two platform sections of any given platform are then in the retracted position, they do not interfere with the sling or the support structure. Suitable guard rails 153 may be provided on the work platforms to safeguard the personnel who are servicing the missile.

In operation, the tower is initially in the lowered position. The vehicle 17 with the missile carrier thereon is moved along the roadway 19 into the tower 10, as shown in Figure 1. The support rails 31 and 32 are then raised on either side of the missile and vehicle by the actuator 38 to the full line position shown in Figure 6. The sling 51 is then connected to the support rails by toggle clamps 52 so that the missile can be carried by the structure of the tower 10. The vehicle 17 is then lowered, if means are provided on the vehicle to permit such lowering, or the rails 31 and 32 are raised until the missile and sling are clear of the vehicle 17. It is then merely necessary to remove the vehicle 17 from the tower 10 by rolling it out along the roadway 19. The upper sections 141 of two or more axially spaced work platforms are then moved into the extended position over the missile and the support rails are adjusted to bring the missile against the extended sections 141 so that the missile will be in the properly aligned position within the tower 10. Because the missile is then embraced on its lower side by the sling 51, and on its upper side by two or more work platforms, the missile is laterally confined within the tower 10. The load arms 103, shown in Figure 12 are then brought into engagement with the end of the missile 16 by the motor 112 so that the missile is axially located within the tower 10. Fluid under pressure is then supplied to the actuators 56 so the tower 10 and missile 16 are raised to the erected or upright position. At this time, the weight of the missile is carried by the load arms 103 and the lower end of the missile is slightly above the base 21. The motor 112 is then operated to lower the load arms 103 until the missile is supported by the base 21 in the upright position and the load arms rotate clear. The support rails 31 and 32 and the sling 51 are then lowered by the actuator 38 to the phantom position shown in Figure 6, at which time the sling is draped across the side of the tower 10 and is out of the way of the remaining sections 141. The remaining sections 141 are then extended so that a complete work platform is provided around the missile 16 giving the service personnel adequate access to the various stations of the missile.

The missile 16 can then be serviced and fueled if necessary to prepare it for firing. As soon as the missile is ready for firing, all of the sections 141 of the platforms 54 are retracted, thus clearing the missile of any connection with the tower. At this time, pressure fluid is supplied to the retraction chamber 91 of the actuators 56 and the tower 10 is returned to the horizontal position. While the tower is being lowered, the actuator 38 can be used to raise the support rails 31 and 32 to lift the sling clear. After the tower is in the lowered position, the sling can be manually removed or the vehicle 17 can be moved into the tower, and the sling placed in the vehicle by disconnecting the toggle clamps 52.

At this point, the missile is cleared of the tower in its upright position, and can be fired after which the entire operation can be repeated with another missile. Those skilled in the art will recognize that various control devices and safety features could be added to the basic structure described to suit the particular needs of any given missile while still using the basic concepts disclosed and claimed herein. If the operation is to be made essentially automatic, additional actuators could be supplied to operate the support rail adjustment mechanism, the toggle clamps 52, and the various other apparatus described.

Although the preferred embodiment of this invention is illustrated it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

We claim:
1. A mechanism for rotating an elongated load from a horizontal to a vertical position comprising a tower rotatable between a horizontal and a vertical position, power means connected to said tower operable to move said tower between said horizontal and vertical positions, means on said tower for supporting said load including a load receiving flexible sling wherein the load is supported uniformly along a substantial portion of its surface, gage means on said tower adapted to engage the load when it is in a predetermined position in said tower, and adjusting means for moving said sling and in turn said load relative to said tower in any direction whereby said load can be moved into said predetermined position against said gage means.

2. A mechanism for moving an elongated load from a horizontal to a vertical position comprising a tower movable between a horizontal and a vertical position, power means connected to said tower operable to move said tower between said horizontal and vertical positions, means on said tower for supporting said load including a flexible sling adapted to receive said load whereby said load is supported uniformly along a substantial portion of its length, gage means on said tower adapted to engage the load when it is in a predetermined position in said tower, and adjusting means adapted to move said sling and in turn said load relative to said tower in any direction whereby said load can be moved into said predetermined position against said gage means, said gage means and sling co-operating to prevent lateral movement of said load when the tower moves to the vertical position.

3. A device for erecting a missile comprising an elongated frame having a U-shaped cross section pivoted for rotation between a horizontal and a vertical position, a sling supported by said frame adapted to engage the under side of and support a missile when the frame is in said horizontal position, a member mounted on said frame for movement between a retracted position wherein it is clear of the missile and an extended position wherein it is extending over said missile, said member co-operating with said sling to prevent lateral movement of the missile relative to said frame, means for rotating said frame and missile to said vertical position, said frame being completely clear of said missile when said member is in said retracted position.

4. A device for erecting a missile on a firing base comprising an elongated tower having a U-shaped cross section pivoted for rotation between a horizontal and a vertical position, a sling supported along its parallel edges by said tower adapted to engage the under side of and support a missile when the tower is in said horizontal position, a pair of movable platform sections mounted on said tower for movement between a retracted position when they are clear of the missile and an extended position when they are extending over said missile, said sections co-operating with said sling to substantially surround the missile and prevent lateral movement thereof relative to said tower, power means for moving said tower and missile to said vertical position, and means for lowering said missile relative to said tower while it is in a vertical position until it engages and is supported by said base.

References Cited in the file of this patent

UNITED STATES PATENTS

| | | |
|---|---|---|
| 627,380 | Belknap | June 20, 1899 |
| 1,247,010 | Rice | Nov. 20, 1917 |
| 1,689,156 | Ruffner | Oct. 23, 1928 |
| 1,859,501 | Durbin | May 24, 1932 |
| 2,004,060 | Brown | June 4, 1935 |
| 2,345,253 | Funk | Mar. 28, 1944 |
| 2,423,251 | Muller | July 1, 1947 |
| 2,693,770 | Hubscher | Nov. 9, 1954 |
| 2,787,339 | Woolslayer | Apr. 2, 1957 |

FOREIGN PATENTS

| | | |
|---|---|---|
| 21,019 | Great Britain | Oct. 17, 1905 |